Dec. 21, 1943.                H. J. VEATCH                 2,337,139
                         OBJECT VIEWING INSTRUMENT
                            Filed June 20, 1941
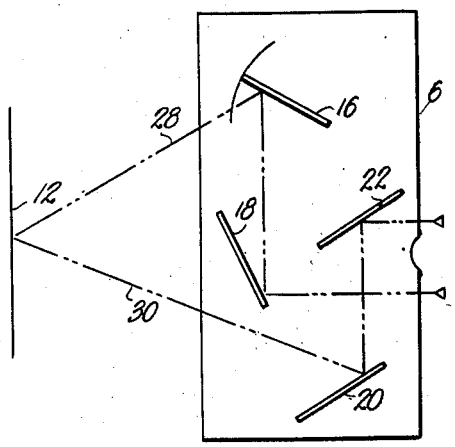
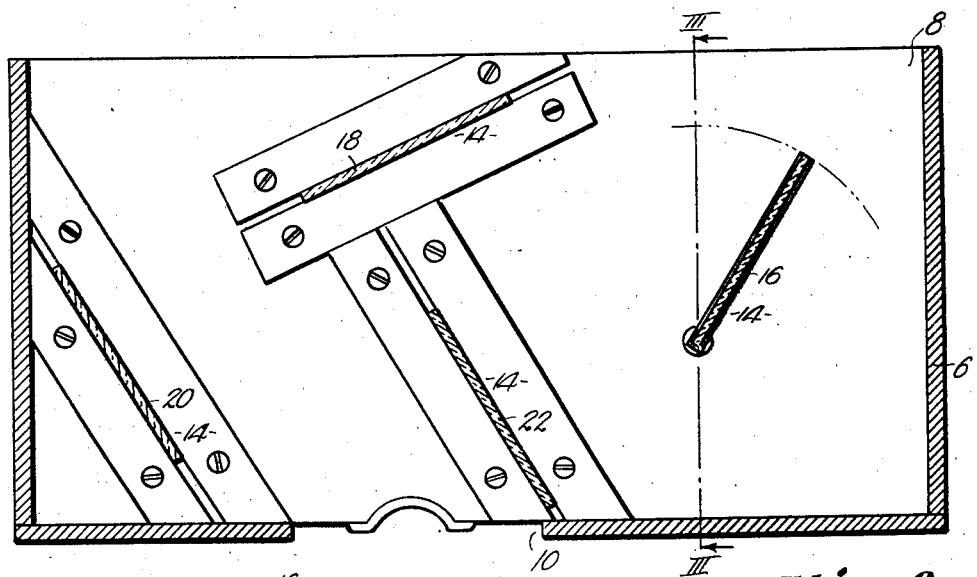
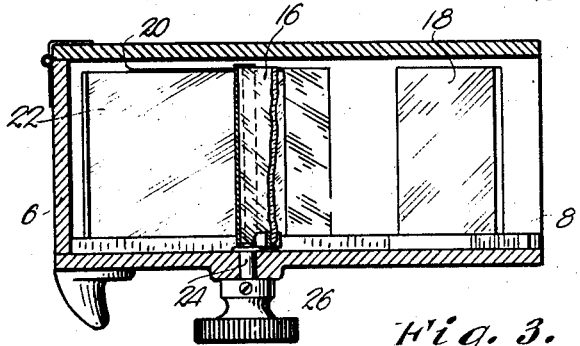
INVENTOR.
Harry J. Veatch
BY
ATTORNEY.

Patented Dec. 21, 1943

2,337,139

UNITED STATES PATENT OFFICE 2,337,139

OBJECT VIEWING INSTRUMENT

Harry J. Veatch, Pittsburg, Kans.

Application June 20, 1941, Serial No. 398,961

3 Claims. (Cl. 88—29)

This invention relates to optical apparatus in the nature of an object viewing instrument designed to impart to photographs, prints, X-ray negatives, and similar normally planar illustrations, an additional dimension or the illusion of depth.

One of the important aims of this invention is the provision of an object viewing instrument of the foregoing character having a number of sets of reflectors disposed to direct reflected rays of light from a picture or the like being viewed, that would normally enter the right eye of the observer to the left eye and vice versa.

A still further aim of the instant invention is to provide an object viewing instrument having a novel and unique case provided with at least two openings, one of which receives the reflected rays of light from the object being viewed, while the other of said openings is disposed to direct said rays of light to the eyes of the user after the said rays have been acted upon by a number of reflecting surfaces positioned within the case in a special manner.

Heretofore stereoscopic effects have been obtained only through the employment of two photographs or prints made from slightly different angles and combined to be viewed through lenses held before the eyes of the observer in order that the illusion of depth might be obtained. To my knowledge, that quality of depth required to enjoy viewing photographs or prints and necessary in reading X-ray negatives, for example, has not been obtainable through an optical instrument. It has been found by commercially using the object viewing instrument, made in accordance with this invention and about to be described, that such instrument is fully capable of attaining the desirable additional dimensional effect when viewing single photographs.

The preferred embodiment of the invention is illustrated in the accompanying drawing wherein:

Fig. 1 is a diagrammatical view of an object viewing instrument illustrating the manner of use.

Fig. 2 is a horizontal cross sectional view through the instrument; and

Fig. 3 is a vertical cross sectional view taken on line III—III of Fig. 2.

The case 6 may be of any suitable size to suit the use to which the instrument is put. Its width should be appreciably greater than the distance between the eyes of the user because of the disposition of certain of the reflectors.

Case 6 has an opening 8 in one side and a second opening 10 in a side of case 6 opposite to opening 8.

In practice, the entire side of case 6 opposite to opening 10 may be left open for the reception of reflected rays of light coming from the viewed object 12.

The reflectors may be in the nature of vertical, planar mirrors 14 of like characteristics and arranged in sets of two. One set has mirrors 16 and 18, while another set has mirrors 20 and 22. At least one of the mirrors of one of said sets should be adjustable to accommodate the eyes of the particular user and therefore, reflector 16 is mounted upon a shaft 24 that terminates in a knob or the like 26, through the medium of which the operator may swing reflector 16 about the axis of shaft 24.

The rays of reflected light entering case 6 and falling upon reflector 16 are represented by the dotted line 28. These rays of light are reflected from the surface of reflector 16 to the surface of reflector 18 and thence out through opening 10 and into the left eye of the user. The rays of reflected light from the object 12 that would normally enter the left eye of the observer are, when this instrument is used, reflected from the path of travel indicated by the dotted line 30 from reflector 20 to reflector 22 and thence to the right eye of the user. These projected paths of travel 28 and 30 therefore, cross immediately prior to entering the eyes of the person viewing the object 12 and as a result, the illusion of depth or stereoscopic effect is obtained.

An instrument made in accordance with this invention is particularly useful by technicians studying X-ray negatives and will be capable of advantageous employment by those viewing photographs or prints, merely to enhance the same by adding to the normal vision thereof, the additional dimension of depth.

Obviously other instrumentalities accomplishing the results contemplated and falling within the purview of the concepts and following claims, might be used without departing from the spirit of this invention.

Having thus described the invention, what is claimed as new and desired to be secured by Letters Patent is:

1. An object viewing instrument of the character described comprising a case provided with a pair of openings, one of said openings being disposed to receive reflected rays of light from the object being viewed, the second of said openings being arranged to permit the passage of said rays of light from the case; and a plurality of reflectors in the case arranged to direct rays of light reflected from a single focal point on the object being viewed normally entering the right eye to the left eye and vice versa, whereby the illusion of depth is imparted to the user.

2. An object viewing instrument of the character described comprising a case having opposed openings, one of said openings being disposed to receive reflected rays of light from the object being viewed, the second of said openings being arranged to permit the passage of said rays of light from the case to a viewer; and sets of reflectors in the case arranged to receive rays of light diverging to the right and left from a single focal point on the object and reflect said rays of light reversely to the left and right eye of the viewer whereby the illusion of depth is imparted to said viewer.

3. An object viewing instrument of the character described comprising a case having opposed openings, one of said openings being disposed to receive reflected rays of light from the object being viewed, the second of said openings being arranged to permit the passage of said rays of light from the case to a viewer; and pairs of reflectors in the case arranged to receive rays of light diverging to the right and left from a single focal point on the object and reflect said rays of light reversely to the left and right eye of the viewer whereby the illusion of depth is imparted to said viewer, a reflector of one of said pairs being pivotally mounted in the case to accommodate the instrument to the eyes of the viewer.

HARRY J. VEATCH.